(No Model.)

A. J. CROSS.
WATERING TROUGH.

No. 353,289. Patented Nov. 30, 1886.

Witnesses
James M. Hitton
J. W. Garner

Inventor
A. J. Cross
By his Attorneys
C. A. Snow & Co.

UNITED STATES PATENT OFFICE.

ADELBERT J. CROSS, OF SEDGWICK, KANSAS.

WATERING-TROUGH.

SPECIFICATION forming part of Letters Patent No. 353,289, dated November 30, 1886.

Application filed March 24, 1886. Serial No. 196,404. (No model.)

*To all whom it may concern:*

Be it known that I, ADELBERT J. CROSS, a citizen of the United States, residing at Sedgwick, in the county of Harvey and State of Kansas, have invented a new and useful Improvement in Watering-Troughs for Hogs and other Animals, of which the following is a specification, reference being had to the accompanying drawings.

My invention relates to an improvement in watering-troughs for hogs and other animals; and it consists in the peculiar construction and combination of parts that will be more fully set forth hereinafter, and particularly pointed out in the claim.

Figure 1:
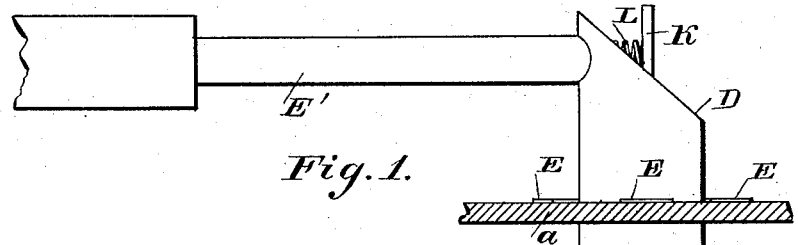
Figure 2:
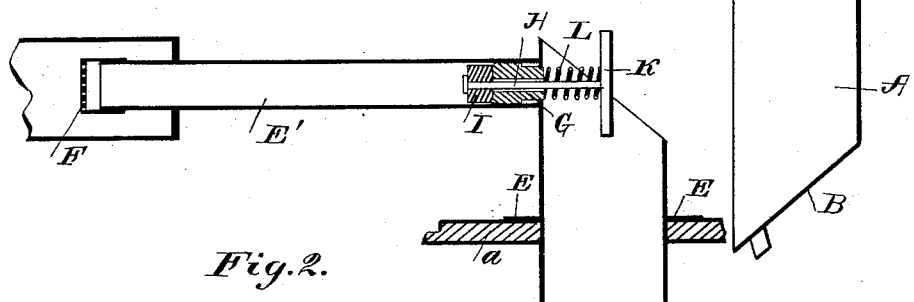
Figure 3:
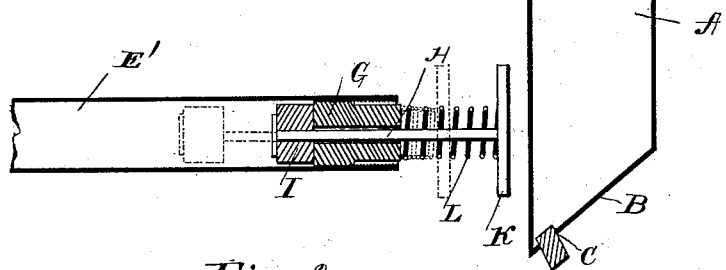

In the drawings, Figure 1 is a side elevation of my invention. Fig. 2 is a vertical sectional view of the same. Fig. 3 is a detail view of the spring-actuated valve.

A represents a vertical trough, which may be either made of wood or metal, and either cylindrical, rectangular, or of any other preferred shape. The lower end of this trough is closed, as at B, the bottom thereof being inclined, as shown, and provided with an opening, C, at its lowest side. The upper end of the trough is open, and is beveled or cut away on one side, as at D.

From the sides of the trough, at a suitable distance from the upper end thereof, project brackets E, which are adapted to secure the trough in a vertical position on a suitable platform, $a$, the lower end of the trough extending through and below the said platform. E' represents an inlet-pipe, which is connected at one end to the upper end of the trough A, and is also connected to a suitable source of water, whether a spring, cistern, or pump, and the said pipe E' is preferably provided with a strainer, F. The inner end of the pipe E', which communicates with the upper end of the trough, is provided with a plug, G, having a longitudinal central opening, through which plug extends a valve-shank, H, which is of less diameter than the opening in the trough.

To the inner end of the valve-shank is attached a valve, I, which is made of leather or rubber or other suitable material, and the outer end of the valve-shank is provided with a button, K. A coiled extensile spring, L, is placed on the outer end of the valve-shank and bears between the plug G and the button K, and serves to keep the valve normally closed against the inner end of the plug, which thus forms the valve-seat, so as to cut off the supply of water through the pipe E'.

The opening C in the bottom of the trough is generally kept closed by means of a suitable cork or plug. When a hog or other animal wishes to drink, he inserts his muzzle into the upper end of the trough and causes his face to bear against the button K, and moves the said button inwardly against the tension of the spring, which causes the valve to move away from the opening in the valve-seat, and the water then flows through the pipe E' into the trough. When the animal stops drinking and moves away, the spring forces the button outwardly and closes the valve and prevents waste of water.

A watering-trough for hogs and other animals thus constructed is exceedingly cheap and simple and supplies the animal with fresh water when needed, and prevents waste of the water when not wanted.

By removing the cork or plug from the opening in the lower end of the trough the water therein contained may be drawn out, to prevent an accumulation of dirt and sediment in the trough.

I am aware that it is not new to provide a trough with a supply-pipe having a spring-actuated valve carried by a rod having a button against which the muzzle of the animal bears when it is inserted in the trough to drink water therefrom, and hence I confine myself to the particular construction herein shown and described.

I attach especial importance to the tank having the inclined bottom B, provided with an outlet port or opening, C, that is normally closed by a plug or cock, whereby the tank can be easily and readily emptied of its contents and cleaned, and also to the brackets E, carried by the tank, to suspend the latter from the platform $a$. The tank passes through the platform, and the upper end thereof is open and lies but a short distance above the platform, so that the animal can easily and conveniently drink therefrom, and as the lower end of inclined bottom B of the tank lies some distance below the platform, ready access thereto can be had to remove the plug and cleanse the tank. The plug is exteriorly threaded and screwed into the outer end of the supply-pipe E', which opens directly into the upper end of the tank, and thus prevents any waste of water by leakage between the tank and pipe, and the plug can be easily unscrewed and removed from the supply-pipe when desired.

I also attach importance to the peculiar shape of the tank A, having the mouth cut off diagonally, as this enables the animal to more readily insert his head into the mouth of the tank. Again, the arrangement of the valve in the supply-pipe at right angles to the tank provides for the passage of any water leaking from the pipe directly into the tank. Again, the location of the button K at the highest point of the cut-off mouth D keeps the button inclosed within the tank, and at the same time in convenient reach of the animal, as the latter cannot insert his head into the mouth of the tank without touching the button and opening the valve.

Having thus described my invention, I claim—

In combination with the platform $a$, the tank A, passing through the platform and provided with the inclined bottom B, having an opening, C, closed by a plug, the brackets E, carried by the tank and secured to the platform for suspending the tank therefrom, the water-supply pipe E', secured to the upper end of the tank above the platform, and the operating-valve, as set forth.

In testimony that I claim the foregoing as my own I have hereto affixed my signature in presence of two witnesses.

ADELBERT J. CROSS.

Witnesses:
H. S. MUELLER,
W. C. GIRK.